United States Patent
Hamaguchi et al.

(10) Patent No.: US 12,079,354 B2
(45) Date of Patent: Sep. 3, 2024

(54) COMPUTING DEVICE AND DATA TRANSMISSION METHOD

(71) Applicant: DENSO CORPORATION, Kariya (JP)

(72) Inventors: Kenichi Hamaguchi, Kariya (JP); Nobuhiko Tanibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 440 days.

(21) Appl. No.: 17/563,917

(22) Filed: Dec. 28, 2021

(65) Prior Publication Data

US 2022/0121759 A1    Apr. 21, 2022

Related U.S. Application Data

(63) Continuation of application No. PCT/JP2020/023640, filed on Jun. 16, 2020.

(30) Foreign Application Priority Data

Jul. 9, 2019  (JP) .................................. 2019-127855

(51) Int. Cl.
*G06F 21/60*    (2013.01)

(52) U.S. Cl.
CPC .......... *G06F 21/606* (2013.01); *G06F 21/602* (2013.01); *G06F 2221/2113* (2013.01)

(58) Field of Classification Search
CPC .................................................. G06F 21/606
See application file for complete search history.

(56) References Cited

U.S. PATENT DOCUMENTS

| 2007/0067826 A1* | 3/2007 | Conti | G06F 21/78 |
| | | | 726/2 |
| 2007/0150730 A1* | 6/2007 | Conti | G06F 21/567 |
| | | | 713/166 |
| 2007/0283146 A1* | 12/2007 | Neveux | G06F 21/74 |
| | | | 713/189 |

(Continued)

FOREIGN PATENT DOCUMENTS

| JP | 2014-139772 A | 7/2014 |
| JP | 2019-066995 A | 4/2019 |
| WO | WO-2018/008605 A1 | 1/2018 |

*Primary Examiner* — Simon P Kanaan
(74) *Attorney, Agent, or Firm* — Harness, Dickey & Pierce, P.L.C.

(57) ABSTRACT

A computing device includes a high-security OS application, a low-security OS communication application, and a user interface application. The high-security OS application runs on a high-security operating system. The low-security OS communication application and the user interface application run on a low-security operating system whose security level is lower than the high-security operating system. A data communication between the high-security OS application and the low-security OS communication application is performed by an in-chip applications communication or a wired communication. Data transmitted from the high-security OS application to the low-security OS communication application is encrypted. The low-security OS communication application is configured to decrypt the encrypted data and control, based on the decrypted data, contents displayed on a display. The user interface application configured to display, on the display, contents determined based on data input from an application that runs on the low-security operating system.

6 Claims, 3 Drawing Sheets

(56) References Cited

U.S. PATENT DOCUMENTS

| | | | |
|---|---|---|---|
| 2012/0166746 A1* | 6/2012 | Amar | G06F 21/74 |
| | | | 711/E12.098 |
| 2012/0331464 A1* | 12/2012 | Saito | G06F 9/45533 |
| | | | 718/1 |
| 2013/0219192 A1* | 8/2013 | Park | G06F 21/10 |
| | | | 713/190 |
| 2015/0264057 A1* | 9/2015 | Mevec | H04L 63/123 |
| | | | 726/22 |
| 2015/0302820 A1 | 10/2015 | Ishiguro | |
| 2016/0371501 A1* | 12/2016 | Horley | G06F 21/74 |
| 2019/0370479 A1* | 12/2019 | Uhr | H04L 67/55 |
| 2020/0285778 A1* | 9/2020 | Soffer | G06F 21/74 |
| 2022/0121759 A1* | 4/2022 | Hamaguchi | G06F 21/74 |

\* cited by examiner

COMPUTING DEVICE AND DATA TRANSMISSION METHOD

CROSS REFERENCE TO RELATED APPLICATION

The present application is a continuation application of International Patent Application No. PCT/JP2020/023640 filed on Jun. 16, 2020, which designated the U.S. and claims the benefit of priority from Japanese Patent Application No. 2019-127855 filed on Jul. 9, 2019. The entire disclosures of all of the above applications are incorporated herein by reference.

TECHNICAL FIELD

The present disclosure relates to a computing device and a data transmission method performed by the computing device.

BACKGROUND

General in-vehicle devices include two platforms. Software platforms are often referred to as operating systems.

When multiple operating systems are provided, important information such as vehicle information may be handled by application software operating on an operating system having relatively high security level. The operating system having relatively high security level is referred to as a high-security operating system, and an operating system having relatively low security level is referred to as a low-security operating system for convenience.

The high-security operating system is an AGL (registered trademark) or a QNX (registered trademark), for example. The low-security operating system is a general purpose operating system such as an ANDROID (registered trademark), for example.

Various application software operate on the general purpose operating system. Some of the application software operating on the general purpose operating system use hardware part of the user interface system such as a display and an input unit.

Some of the application software operating on the high-security operating system (hereinafter, referred to as high-security OS application) may use the user interface system. When the high-security OS application uses the user interface system, in order to achieve uniformity in mediation and display style, the high-security OS application does not directly control the user interface system, but sends data to be sent to the user interface system to the low-security operating system. Then, a user interface application that operates on the low-security operating system and controls the user interface system is provided.

By providing the user interface application on the low-security operating system, it is easier to unify the mediation and the display style with the application on the low-security operating system, which uses the user interface system.

However, the low-security operating system is vulnerable to hacking than the high-security operating system. When data is transmitted from the high-security operating system to the low-security operating system, the data of the high-security operating system may be leaked by hacking the low-security operating system.

SUMMARY

A computing device according to a first aspect of the present disclosure is configured to run multiple operating systems each of which has a different security level. The operating systems includes a low-security operating system and a high-security operating system that has the security level higher than the security level of the low-security operating system. The computing device includes at least one high-security OS application that is application software configured to run on the high-security operating system, and a low-security OS communication application that is an application software configured to run on the low-security operating system. The low-security OS communication application is configured to communicate with the at least one high-security OS application. A data communication between the at least one high-security OS application and the low-security communication application is performed by an in-chip applications communication or a wired communication. Data transmitted from the at least one high-security OS application to the low-security OS communication application is encrypted. The low-security OS communication application includes an application configured to communicate with the at least one high-security OS application, decrypt the encrypted data, and control, based on the decrypted data, contents displayed on a display that is the user interface system. The computing device further includes a user interface application configured to run on the low-security operating system and display, on the display, contents determined based on data input from an application that runs on the low-security operating system.

A second aspect of the present disclosure is a method of transmitting data from at least one high-security OS application that runs on a high-security operating system to a low-security OS communication application that runs on a low-security operating system having a lower security level than the high-security operating system. The method includes displaying, on a display by a user interface application that runs on the low-security operating system, contents determined based on data input from an application that runs on the low-security operating system. The method includes generating original data that is to be transmitted by the at least one high-security OS application to the low-security OS communication application, and transmitting, by an in-chip applications communication or a wired communication, the original data to the low-security OS communication application after the original data is encrypted. The method includes decrypting the encrypted data by the low-security OS communication application, and controlling, by the low-security OS communication application, the contents displayed on the display based on the decrypted data.

EMBODIMENTS

Figure 1:
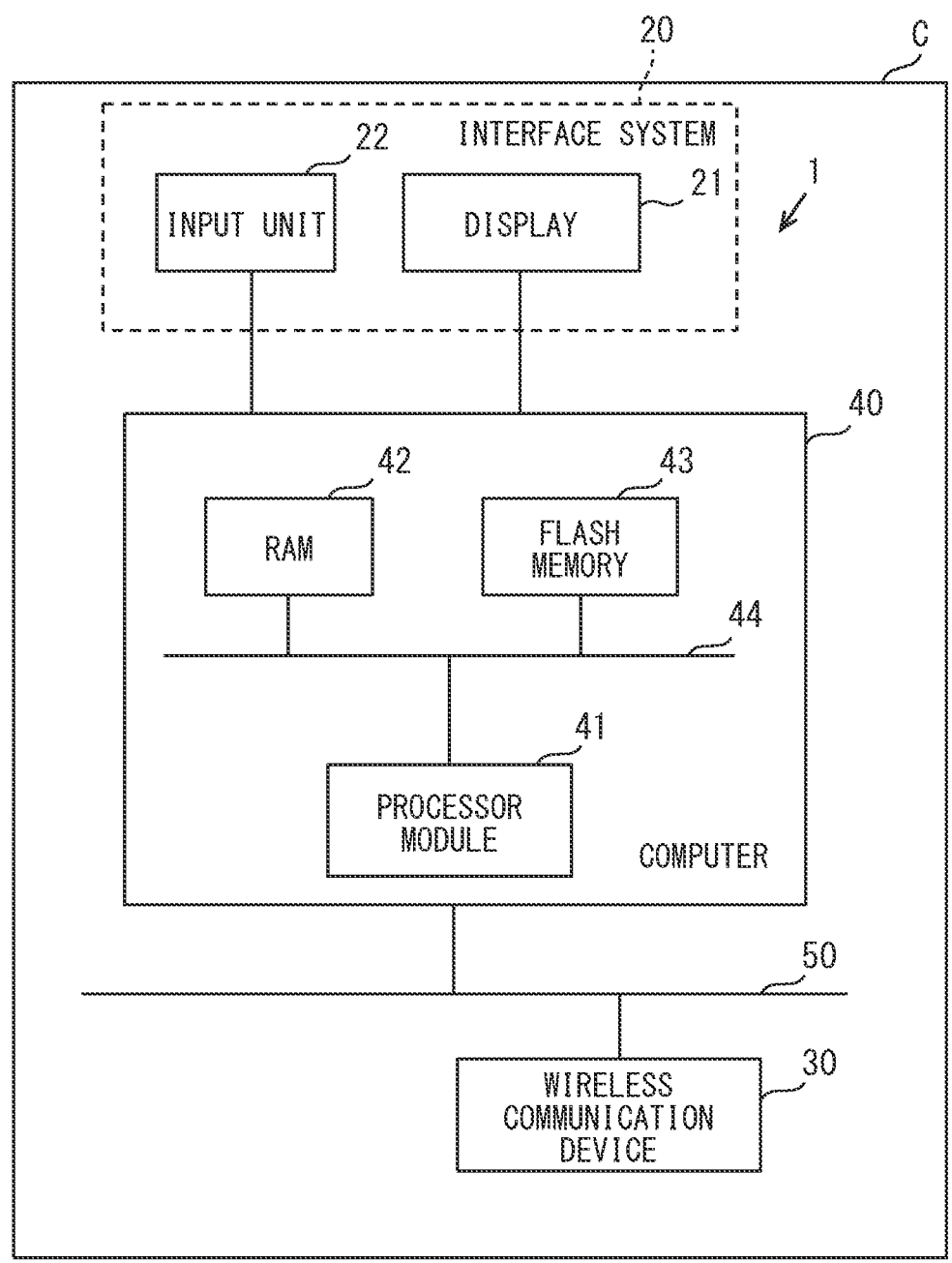
FIG. 1 is a diagram showing an overall configuration of an in-vehicle system.

An embodiment will be described below with reference to the drawings. A in-vehicle system 1 shown in FIG. 1 is mounted in a vehicle C. The in-vehicle system 1 includes a user interface system 20, a wireless communication device 30, and a computer 40 that is a computing device.

The user interface system 20 is a hardware device for transmitting information between the user and the computer 40. FIG. 1 shows a display 21 and an input unit 22 as the user interface system 20.

The display 21 is arranged at a position that can be visually recognized by an occupant in the passenger compartment of the vehicle C. The display 21 is configured to display various images. As the display 21, a liquid crystal display or an organic EL display can be used.

The input unit 22 is a device to which the occupant of the vehicle C inputs various operations. The input unit 22 is, for example, a mechanical switch or a touch panel that is disposed on a display surface of the display 21. Further, a microphone for accepting an audio input may be provided as the input unit 22. The wireless communication device 30 is configured to perform wireless communication with an outside of the vehicle C. The wireless communication device 30 is configured to communicate with a cloud server, for example.

The computer 40 is connected to the user interface system 20, and is also connected to an in-vehicle LAN bus 50. The computer 40 is configured to transmit and receive signals to and from various devices mounted in the vehicle C via the in-vehicle LAN bus 50.

For example, the signals received by the computer 40 via the in-vehicle LAN bus 50 include signals that indicate current states of the vehicle instruments as an image to be displayed on the display 21. The signals may include a signal indicating a vehicle speed, a signal indicating a remaining fuel amount, and the like. Further, the computer 40 may be configured to acquire information required by operating the input unit 22 such as control information of various in-vehicle devices and information outside the vehicle received by the wireless communication device 30. The computer 40 may be configured to acquire the information outside the vehicle received by the wireless communication device 30 through an ECU mounted in the vehicle C.

(Configurations of Computer 40)

As shown in FIG. 1, the computer 40 includes a processor module 41, a RAM 42, a flash memory 43, a bus line 44, and the like. The processor module 41 includes multiple processor cores.

The RAM 42 temporarily stores information or the like read out from the flash memory 43. The flash memory 43 is a non-volatile memory and stores various software programs to be executed by the processor module 41.

Figure 2:
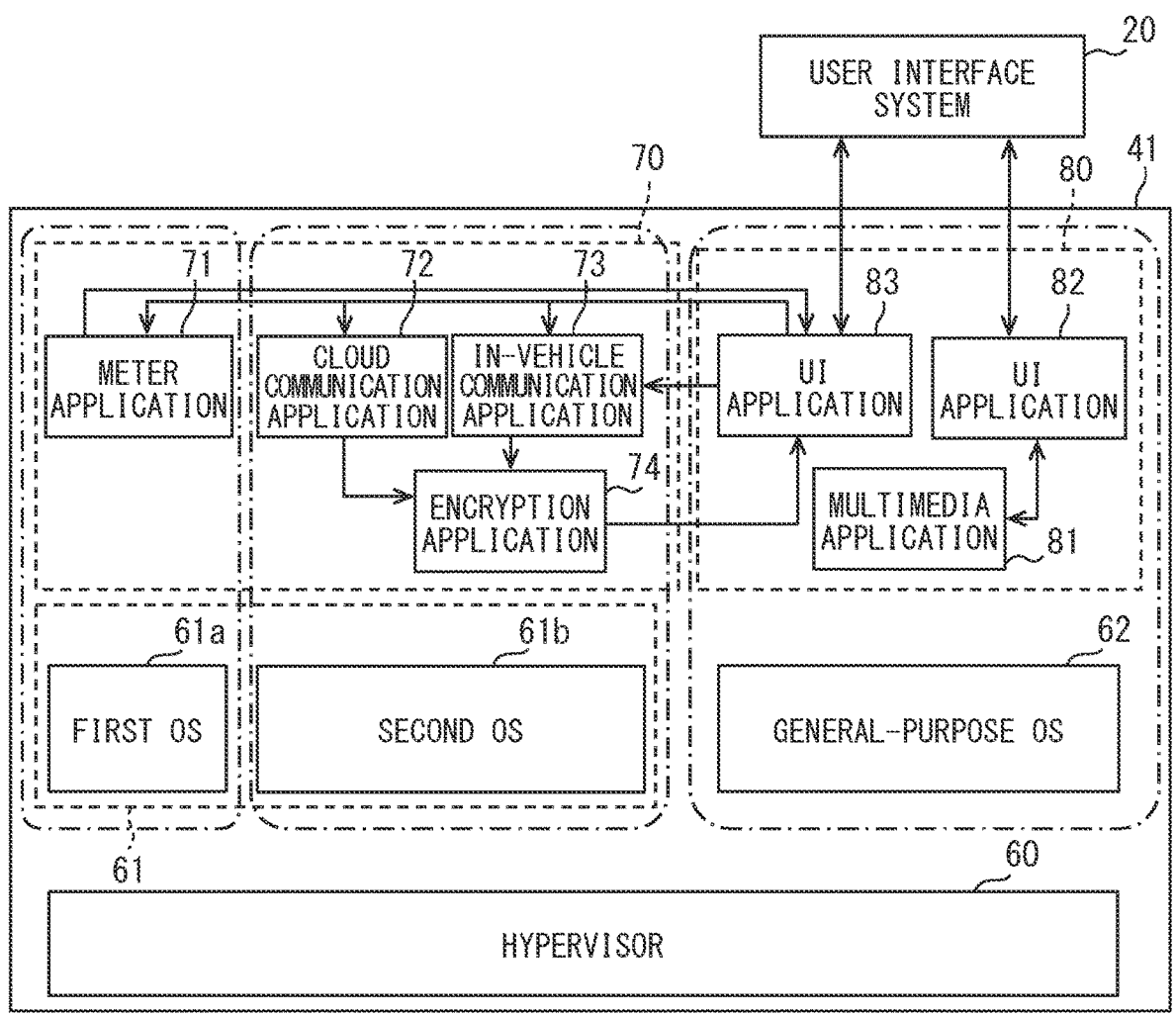
FIG. 2 is a diagram showing software programs executed by a CPU.

The processor module 41 is configured to execute the software programs shown in FIG. 2. Accordingly, the flash memory 43 stores each software program shown in FIG. 2. The various software programs shown in FIG. 2 may be stored in a non-volatile tangible storage medium other than the flash memory 43 in a configuration where the computer 40 is provided with another non-volatile tangible storage medium.

FIG. 2 also schematically shows a hierarchical structure between software programs when the computer 40 executes each software program. As shown in FIG. 2, the processor module 41 includes a hypervisor 60, a high-security operating system 61, a general purpose operating system 62, a high-security OS applications 70, and a low-security OS applications 80. The application may be also referred to as an application software.

The hypervisor 60 is a software program that creates a virtual environment on the computer 40. Specifically, the hypervisor 60 is a software program that creates an environment in which the high-security operating system 61 and the general purpose operating system 62 can operate in parallel in one computer 40. The high-security operating system 61 has a higher security level than the security level of the general purpose operating system 62.

In the present embodiment, the processor module 41 is configured to execute, as the high-security operating system 61, a first operating system 61a and a second operating system 61b. The processor core executing the first operating system 61a, the processor core executing the second operating system 61b, and the processor core executing the general purpose operating system may be different processor cores. However, some or all of the processor cores of the processor module 41 may execute multiple operating systems. The high-security operating system 61 may execute only one high-security operating system 61.

The first operating system 61a is a real-time operating system, for example. The real-time operating system is an operating system that performs real-time processing. Real-time operating systems are highly stable. The real-time operating system may be a QNX, for example.

The second operating system 61b may be an AGL, for example. Any one of the first operating system 61a and the second operating system 61b may have a higher security level.

The general purpose operating system 62 has a lower security level than the security level of the high-security operating system 61. The general purpose operating system 62 is an example of a low-security operating system. The general purpose operating system 62 is an ANDROID, for example.

In FIG. 2, a meter application 71, a cloud communication application 72, an in-vehicle communication application 73, and an encryption application 74 are shown as the high-security OS applications 70.

The meter application 71 operates on the first operating system 61a. The cloud communication application 72, the in-vehicle communication application 73, and the encryption application 61b operate on the second operating system 61b.

The meter application 71 is configured to determine the vehicle speed that is information for determining an image of meters or the like to be displayed on the display 21. The meter application 71 is configured to transmit the data indicative of the determined vehicle speed to a user interface application 83 (hereinafter, referred to as a UI application).

The cloud communication application 72 is configured to transmit and receive data to and from the cloud server by controlling the wireless communication device 30. The data acquired by the cloud communication application 72 from the cloud server may contain at least one of information related to the vehicle C or information related to the occupant of the vehicle C. The cloud communication application 72 is configured to convert the information acquired from the cloud server into information to be provided to the UI application 83. The cloud communication application 72 is configured to transmit the converted information to the UI application 83 via the encryption application 74.

The in-vehicle communication application 73 is configured to acquire in-vehicle information of an inside of the vehicle by communicating with the ECUs mounted in the vehicle C in accordance with the instruction from the UI application 83. The in-vehicle communication application 73 is configured to convert the acquired in-vehicle information into a format that can be understood by the UI application 83. The in-vehicle communication application 73 is configured to transmit the converted data to the UI application 83 via the encryption application 74.

The encryption application 74 is configured to encrypt the data provided by the cloud communication application 72 and the in-vehicle communication application 73, and transmit it to the UI application 83. For the encryption application 74, the cloud communication application 72 and the in-vehicle communication application 73 are original data generating applications configured to generate original data to be transmitted to the UI application 83.

The communication method between the encryption application 74 and the UI application 83 is not limited. For example, the encryption application 74 and the UI application 83 may communicate with each other using various communication methods such as a shared memory communication and a socket communication.

The encryption application 74 and the UI application 83 are executed by the same processor module 41. Accordingly, the communication between the encryption application 74 and the UI application 83 is an in-chip applications communication regardless of the communication method. The in-chip applications communication is a communication between applications executed by one or multiple processors included in one chip. The encryption method is not limited. For example, the encryption application 74 and the UI application 83 may communicate with each other by SSH.

The low-security OS application 80 has a multimedia application 81 and the UI applications 82, 83. Although one multimedia application 81 is shown in FIG. 2, multiple multimedia applications 81 may be provided. The multimedia application 81 is, for example, a navigation application or an audio application.

The multimedia application 81 is configured to transmit various data to the UI application 82. The multimedia application 81 is configured to perform process according to an instruction from the UI application 82. For example, when the multimedia application 81 is the navigation application, an instruction to search a route is input to the navigation application from the UI application 82. The UI application 82 is configured to acquire the instruction from the input unit 22, e.g. the instruction to search the route. When the instruction to search the route is input, the navigation application performs route search process. The data indicating the route searched by the route search process is transmitted to the UI application 82. The communication between the multimedia application 81 and the UI application 82 is not encrypted.

The UI application 82 is a software part of the interface between the multimedia application 81 and the user. The user interface system 20 is a hardware part of the interface between the multimedia application 81 and the user.

The UI application 82 is configured to output, to the multimedia application 81, the instruction determined according to the signal from the input unit 22. The UI application 82 is configured to determine the contents to display on the display 21 based on the data input from the multimedia application 81 and display the contents on the display 21.

The UI application 83 corresponds to a low-security OS communication application and is a software part of the interface between the high-security OS application 70 and the user. When the signal input from the input unit 22 to the UI application 83 is the instruction to the high-security OS application 70, the UI application 83 transmits the instruction to the high-security OS application 70 based on the contents of the instruction.

When the data is transmitted from the encryption application 74 to the UI application 83, the UI application 83 decrypts the data and performs the process determined based on the decrypted data. For example, when the decrypted data indicates the vehicle speed, the UI application 83 changes the vehicle speed displayed on the display 21 and displays the newly acquired vehicle speed.

When the UI application 83 is requested by the input unit 22 to acquire the data stored in the cloud server, the UI application 83 transmits, to the cloud communication application 72, the instruction to acquire the data from the cloud server. In response to the instruction, the cloud communication application 72 acquires the data determined based on the instruction from the cloud server. The cloud communication application 72 is configured to transmit the acquired data to the UI application 83 via the encryption application 74. The UI application 83 decrypts the data and outputs the data to the user interface system 20.

(Process Related to Inter-OS Communication)

Figure 3:
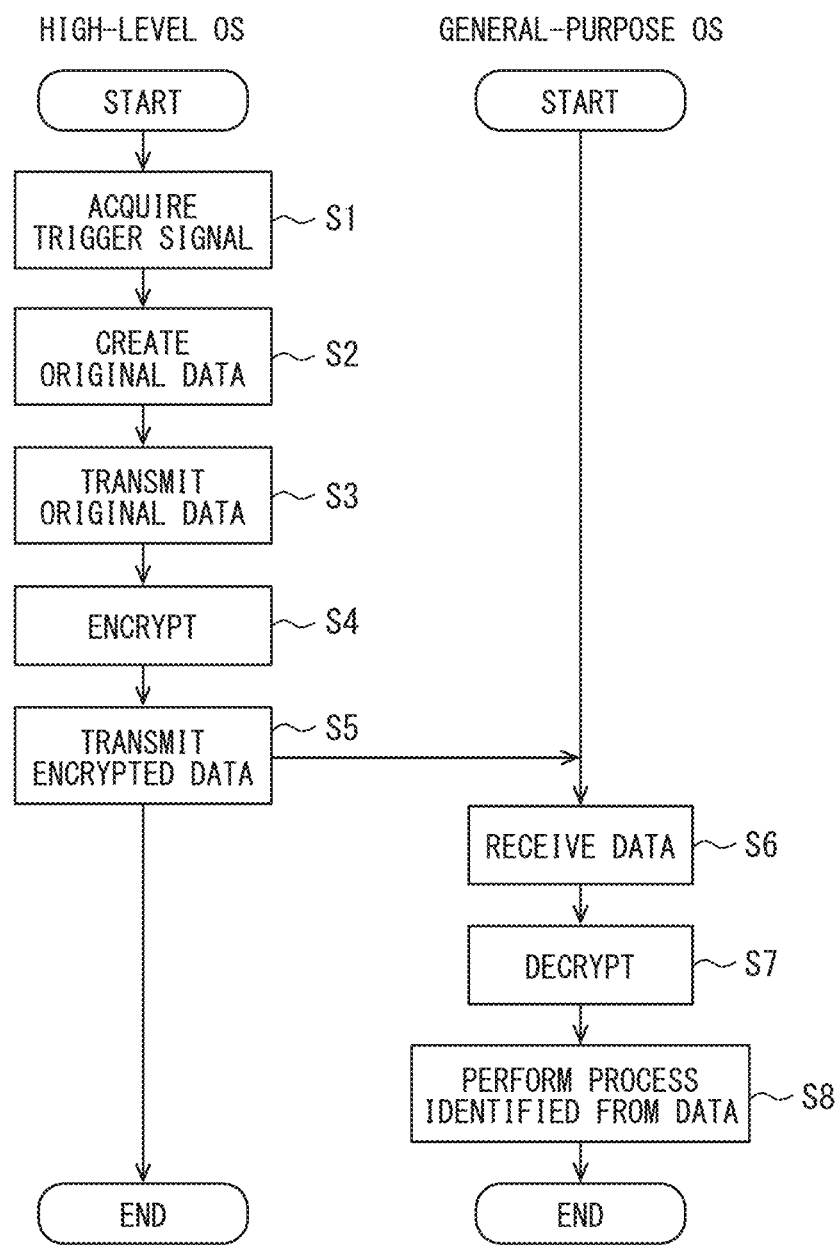
FIG. 3 is a flowchart of a process related to communication between OS.

An example of process for transmitting the data between the OS is shown as a flowchart in FIG. 3. The data transmission method is shown in FIG. 3. Steps S1-S3 are executed by the cloud communication application 72 or the in-vehicle communication application 73. Steps S4, S5 are executed by the encryption application 74. Steps S6-S8 are executed by the UI application 83.

A trigger signal is acquired in step S1. The trigger signal for the cloud communication application 72 is an instruction signal for acquiring information stored in the cloud server, for example. The trigger signal for the in-vehicle communication application 73 is a signal indicative of settings of in-vehicle devices, for example.

In step S2, the original data determined by the trigger signal acquired in step S1 is generated. The original data is data to be transmitted to the UI application 83 and is the data before encryption. In step S3, the original data generated in step S2 is transmitted to the encryption application 74. In step S4, the encryption application 74 encrypts the original data. In step S5, the encryption application 74 transmits the encrypted data to the UI application 83.

In step S6, the UI application 83 receives the data transmitted from the encryption application 74. In step S7, the UI application 83 decrypts the received data. In step S8, the process determined by the data decrypted in step S7 is performed.

Summary of Embodiment

In the in-vehicle system 1 of the present embodiment described above, the high-security operating system 61 and the general purpose operating system 62 operate on the same processor module 41. When the data is transmitted between the operating systems operating on the same processor module 41, the data is usually sent without encryption. However, even when the high-security operating system 61 has a high security level, the data handled by the application operating on the high-security operating system 61 may be leaked or tampered if the general purpose operating system 62 is hacked.

In view of the above point, in the in-vehicle system 1 of the present embodiment, the high-security OS application 70 is configured to encrypt the data before transmitting the data to the general purpose operating system 62. Accordingly, it may be possible to prevent the data handled by the high-security OS application 70 from being leaked or tampered when the general purpose operating system 62 is hacked.

Further, in the present embodiment, the UI application 83 configured to communicate with the high-security OS application 70 and control the user interface system 20 is an application operating on the general purpose operating system 62. This allows for mediation and display uniformity to be maintained between the high-security OS applications 70 and the low-security OS applications 80. The data transmitted from the cloud communication application 72 and the in-vehicle communication application 73 to the UI application 83 is encrypted. Accordingly, the leakage or the tamper due to the transmission of the data from the cloud communication application 72 or the in-vehicle communication application 73 to the UI application 83 can be suppressed.

In the present embodiment, the cloud communication application 72 is provided as the high-security OS application 70. The cloud communication application 72 is configured to acquire at least one of information related to the vehicle C or information related to the occupant of the vehicle C from the cloud server, and provide the acquired information to the UI application 83. If the information related to the vehicle C or the information related to the occupants of the vehicle C is leaked or tampered, the vehicle traveling may be hindered. However, in the present embodiment, the data transmitted from the cloud communication application 72 to the UI application 83 is encrypted. Accordingly, the leakage and the tamper of the information related to the vehicle C and the information related to the occupant of the vehicle C can be suppressed.

In the present embodiment, the encryption application 74 is configured to acquire data from the cloud communication application 72 and the in-vehicle communication application 73, and encrypt the acquired data. The encryption application 74 is configured to transmit the encrypted data to the UI application 83. Accordingly, the program size of the high-security OS application 70 can be smaller as a whole compared to a case where multiple high-security OS application 70 are configured to individually encrypt the data.

Although the embodiment has been described above, the disclosed technology is not limited to the above-described embodiment, and the following modifications are included in the disclosed range, and various modifications can be made without departing from the gist except as described below. In the following description, elements having the same reference numerals as those used so far are the same as elements having the same reference numerals in the previous embodiments, except when specifically mentioned. When only some parts of the configuration are described, the previously described embodiment may be applied to other parts of the configuration.

First Modification

For example, in the embodiment, one processor module 41 of one computer 40 operates in parallel the high-security operating system 61 and the general purpose operating system 62. However, one computer may have multiple processor modules, and the high-security operating system 61 and the general purpose operating system 62 may be executed by different processor modules.

Further, multiple computers connected by wire may be provided, and the high-security operating system 61 and the general purpose operating system 62 may be operated by different computers. In this case, the data communication between the high-security OS application 70 and the UI application 83 that is the low-security OS communication application is performed by wired communication.

Second Modification

In the embodiment, the encryption application 74 configured to encrypt the data generated by the cloud communication application 72 or the in-vehicle communication application 73 is provided. However, the cloud communication application 72 and the in-vehicle communication application 73 may be configured to encrypt the data and transmit the encrypted data to the UI application 83.

Third Modification

In the embodiment, the UI application 83 configured to control the user interface system 20 is provided as the low-security OS communication application. However, the low-security OS communication application may have functions other than the function to control the user interface system 20 as long as the low-security OS communication application is configured to communicate with the high-security OS application 70.

Fourth Modification

In the embodiment, the data transmitted from the high-security OS application 70 to the UI application 83 is encrypted. In addition to this, the data transmitted from the UI application 83 to the high-security OS application 70 may be encrypted.

Fifth Modification

In the embodiment, the meter application 71 is configured to transmit the data to the UI application 83 without encrypting the data. However, the meter application 71 may be configured to encrypt the data before transmitting the data to the UI application 83. In this case, the meter application 71 itself may encrypt the data. Alternatively, an encryption application operating on the first operating system 61a may be added.

What is claimed is:

1. A computing device configured to run a plurality of operating systems each of which has a different security level, the plurality of operating systems including a low-security operating system and a high-security operating system that has the security level higher than the security level of the low-security operating system, the computing device comprising:
at least one high-security OS application that is application software configured to run on the high-security operating system; and
a low-security OS communication application that is an application software configured to run on the low-security operating system, the low-security OS communication application being configured to communicate with the at least one high-security OS application, wherein
a data communication between the at least one high-security OS application and the low-security communication application is performed by an in-chip applications communication or a wired communication,
data transmitted from the at least one high-security OS application to the low-security OS communication application is encrypted,
the low-security OS communication application includes an application configured to
communicate with the at least one high-security OS application,
decrypt the encrypted data, and
control, based on the decrypted data, contents displayed on a display that is the user interface system, and the computing device further comprises:
a user interface application configured to run on the low-security operating system and display, on the display, contents determined based on data input from an application that runs on the low-security operating system.

2. The computing device according to claim 1, further comprising:
a computer configured to run the high-security operating system and the low-security operating system in parallel.

3. The computing device according to claim 2, wherein the computer includes at least one processor, and
the high-security operating system and the low-security operating system are operated by a same processor of the at least one processor.

4. The computing device according to claim 1, the computing device being used in a vehicle, wherein the at least one high-security OS application is configured to transmit at least one of data related to the vehicle or data related to an occupant of the vehicle to the user interface system via the low-security OS communication application.

5. The computing device according to claim 1, wherein the at least one high-security OS application includes
a plurality of original data generating applications configured to generate original data to be transmitted to the low-security OS communication application, and
an encryption application configured to
acquire the original data from the plurality of original data generating applications,
encrypt the acquired original data, and
transmit the encrypted data to the low-security OS communication application.

6. A method of transmitting data from at least one high-security OS application that runs on a high-security operating system to a low-security OS communication application that runs on a low-security operating system having a lower security level than the high-security operating system, the method comprising:
displaying, on a display by a user interface application that runs on the low-security operating system, contents determined based on data input from an application that runs on the low-security operating system;
generating original data that is to be transmitted by the at least one high-security OS application to the low-security OS communication application;
transmitting, by an in-chip applications communication or a wired communication, the original data to the low-security OS communication application after the original data is encrypted;
decrypting the encrypted data by the low-security OS communication application; and
controlling, by the low-security OS communication application, the contents displayed on the display based on the decrypted data.

* * * * *